(12) United States Patent
Saastamoinen et al.

(10) Patent No.: US 6,763,732 B1
(45) Date of Patent: Jul. 20, 2004

(54) ARRANGEMENT FOR MEASURING CONCENTRATE FLOW IN CONNECTION WITH A FLOTATION CELL

(75) Inventors: Eljas Saastamoinen, Helsinki (FI); Mikael Forss, Espoo (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/980,439

(22) PCT Filed: Jun. 20, 2000

(86) PCT No.: PCT/FI00/00553

§ 371 (c)(1),
(2), (4) Date: Jan. 31, 2002

(87) PCT Pub. No.: WO01/01080

PCT Pub. Date: Jan. 4, 2001

(30) Foreign Application Priority Data

Jun. 26, 1999 (FI) .................................... 991484

(51) Int. Cl.[7] ................................................ G01F 1/28
(52) U.S. Cl. ..................................................... 73/861.74
(58) Field of Search ................................... ; G01F 1/28

(56) References Cited

U.S. PATENT DOCUMENTS

| | | |
|---|---|---|
| 2,033,306 A | 3/1936 | Schofield |
| 2,896,453 A | 7/1959 | Ryan et al. |
| 3,914,994 A | 10/1975 | Banner |
| 4,133,746 A | 1/1979 | Dopson |
| 5,282,389 A * | 2/1994 | Faivre et al. ............. 73/861.73 |
| 6,212,958 B1 * | 4/2001 | Conley ..................... 73/861.74 |
| 6,367,336 B1 * | 4/2002 | Martina et al. .......... 73/861.74 |

* cited by examiner

*Primary Examiner*—Harshad Patel
(74) *Attorney, Agent, or Firm*—Smith-Hill and Bedell

(57) ABSTRACT

An arrangement for measuring material flow, particularly concentrate flow, in connection with a flotation cell. The arrangement comprises an elongate sensor element extending essentially over the whole transversal area of the material flow to be measured, and a measuring device for detecting the position of the sensor element.

33 Claims, 2 Drawing Sheets

ARRANGEMENT FOR MEASURING CONCENTRATE FLOW IN CONNECTION WITH A FLOTATION CELL

Figure 1:
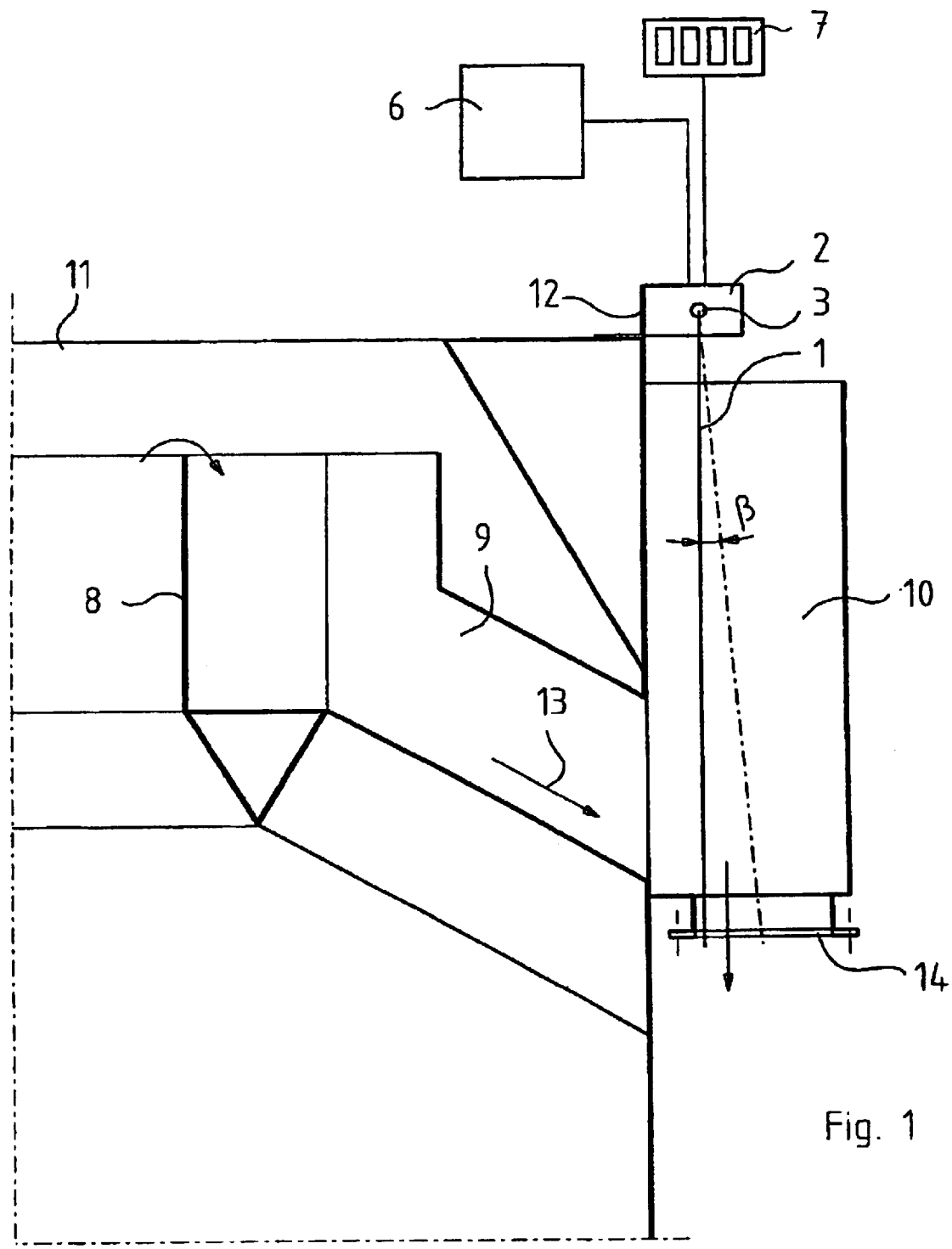

The present invention relates to an arrangement for measuring material flow, particularly concentrate flow, in connection with a flotation cell.

In connection with flotation cells, the measuring of the quantity of flotation concentrates has been difficult, owing to the air content of said concentrates, among others. Conventional quantity meters, such as the V-dam measuring, have turned out to be unreliable when used in connection with flotation cells. In the drain pipe, located in succession to the drain chute, the slurry and liquid, formed of the foam of flotation cells and having different densities, are typically at least partly in layers, which has made the reliable measuring of mass flow more difficult. Indirect calculatory methods have likewise proved to be either unreliable or else there is too much delay for a rapid adjusting of the operation of the flotation cell.

The object of the invention is to realize a completely new arrangement for measuring the mass flow of flotation concentrate, whereby the drawbacks of the prior art can be avoided.

The arrangement according to the invention is characterized in that the arrangement comprises an elongate sensor element that extends essentially over the whole transversal area of the material flow to be measured, and a measuring device for detecting the position of the sensor element.

According to a preferred embodiment of the invention, the measuring device is an angle transmitter. A preferred embodiment of the invention is characterized in that the sensor element is attached to the horizontal axis of the measuring device.

Another embodiment of the invention is characterized in that the horizontal axis of the measuring device is positioned essentially transversally with respect to the flowing direction of the material flow to be measured. The material flow to be measured is advantageously the material flow that flows out of the flotation cell via a drain chute. In a preferred embodiment, the arrangement is provided in connection with the drain chute of a flotation cell, preferably so that the sensor element is at least partly located in the collecting pipe.

The arrangement is typically connected to the control system of the flotation cell. Advantageously the arrangement comprises a display unit. In a preferred embodiment, the sensor element is provided with a calibration means, such as a movable weight.

The arrangement according to the invention has several remarkable advantages. The arrangement according to the invention is well suited to be used in connection with flotation cells. The arrangement is secure in operation, simple in structure and easily applied to various different flotation cells. By means of the sensor element arrangement, there is achieved a good measuring reliability, which has been proved by tests that were carried out. The sensor element reacts well to changes in the material flow, and it is not too sensitive to local changes of velocity. Owing to the small area of the sensor element, the force that is directed to the sensor element by lighter materials with a lower density is relatively small in comparison with the force directed to said sensor element by heavier materials with a higher density. Thus the sensor element is well suited to measure the quantities of concentrate flowing out of flotation cells. The information given by the measuring device can easily be applied when controlling the operation of the flotation cell.

By means of the calibration means arranged in the sensor element, the arrangement according to the invention can be applied to many different usages, and to measuring material flows with varying characteristics.

In the present specification, the term flotation cell means a unit composed of a flotation mechanism, chutes and tank.

Figure 2:
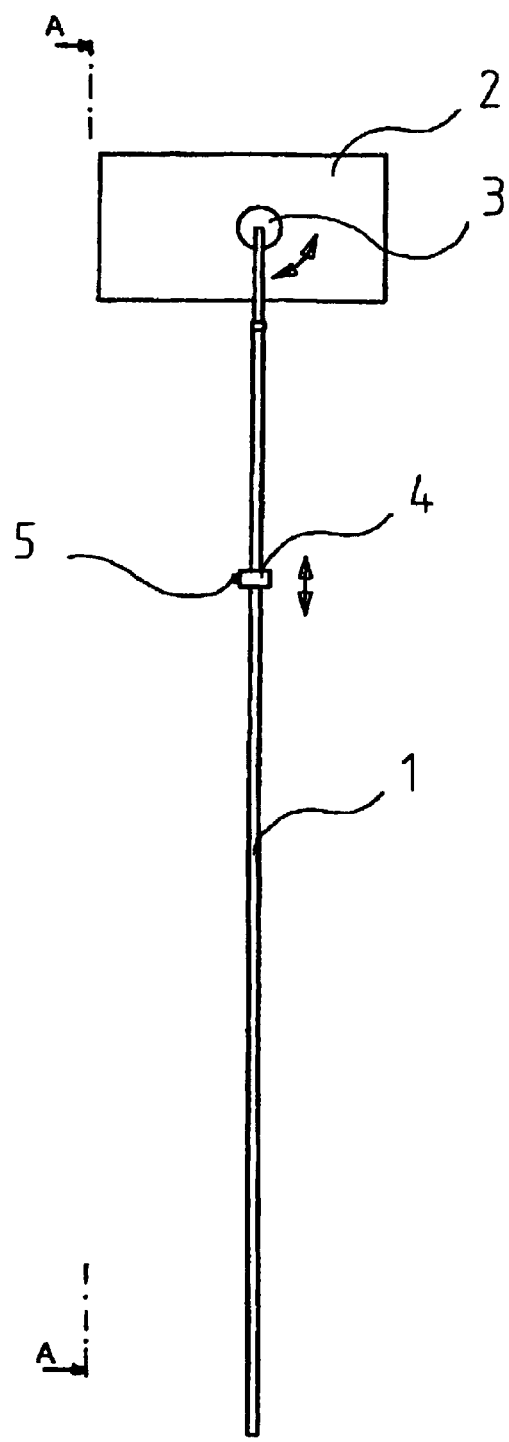
Figure 3:
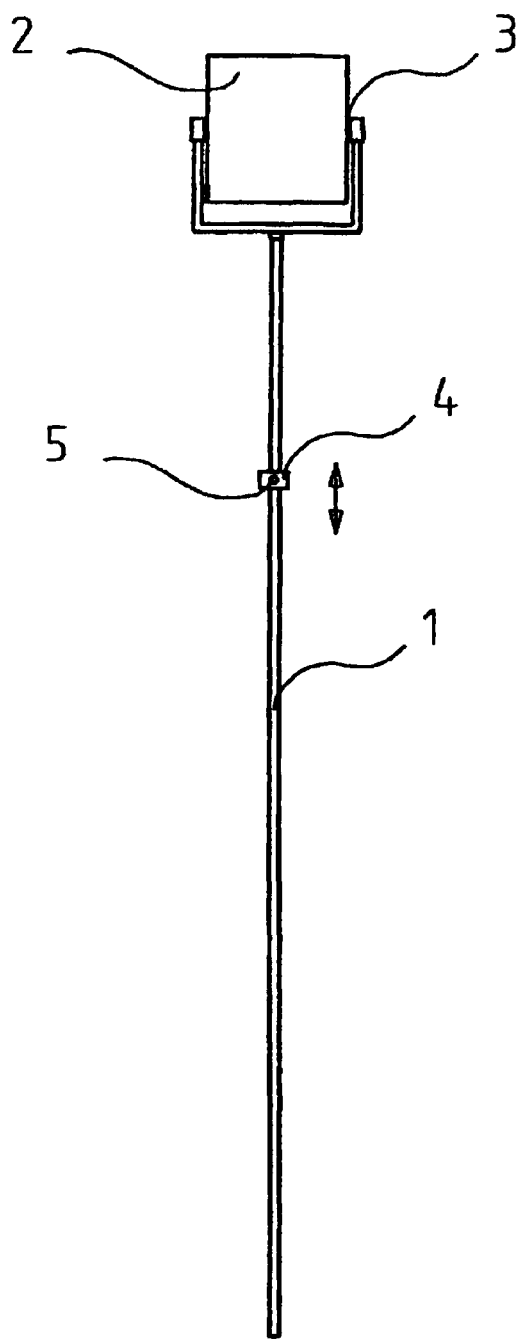

The invention is explained in more detail with reference to the appended drawings, where FIG. 1 illustrates a preferred embodiment of the arrangement according to the invention, FIG. 2 illustrates the measuring device and sensor element of the arrangement according to the invention, and FIG. 3 illustrates the measuring device and sensor element of the arrangement according to the invention, seen in the direction A—A of FIG. 2.

In FIG. 1, there is illustrated only part of an arrangement connected to the removal of froth from a flotation cell. It is assumed that a flotation cell represents technology known as such for a man skilled in the art, wherefore it is not explained in more detail in the present specification. A known flotation cell is described in Canadian Patent 1,218,772.

The arrangement according to the invention for measuring material flow, particularly concentrate flow, in connection with a flotation cell comprises an elongate sensor element 1, which extends essentially over the whole transversal area of the material flow to be measured, and a measuring device 2 for detecting the position of the sensor element 1. In the embodiment illustrated in the drawings, the sensor element 1 is at the top part arranged in the horizontal axis 3 of the measuring device 2. The horizontal axis 3 of the measuring device 2 is positioned essentially transversally with respect to the flowing direction 13 of the material flow to be measured. Typically the measuring device 2 is an angle transmitter.

The arrangement is installed in connection with the drain chute 8 of the flotation cell 11, preferably in a collecting pipe 10. In the embodiment of FIG. 1, the arrangement is installed at the edge of the flotation cell 11, above the collecting pipe 10, by means of an installation frame 12. The arrangement is set to measure the quantity of concentrate in the material flow entering the collecting pipe 10 through the aperture of the drain pipe 9 from the chute 8 of the flotation cell 11. From the collecting pipe 10, the material flow is conducted, via an aperture 14, to further treatment.

The measuring method applied by the arrangement is based on a change in the position of the elongate, narrow sensor element 1, which change is transmitted to the angle transmitter 2 or the like. Most advantageously the sensor element 1 is attached to the axis 3 of the angle transmitter 2 and hangs in free downwardly suspension from the fastening point. The position of the sensor element 1 is continuously changed along with the changes taking place in the concentrate flow 13. The angle transmitter 2 registers the changes in the sensor element 1 as a turn $\beta$ of the horizontal axis 3, and transmits the information of the change to the display 7 and/or to the control system 6 of the flotation cell. The arrangement according to the invention is particularly well suited to observing changes in the relative flowing of concentrate. In a preferred embodiment, the angle transmitter 2 used as the measuring device is a potentiometer, the output current whereof is changed au the position of the sensor element 1 changes. The measuring device is calibrated to level zero when the sensor element 1 hangs in a vertical position. In a typical situation, the strengthening of the flow 13 is observed for instance as a change in the position of the sensor element 1 in percentages with respect to the zero level.

An essential feature in the operation of the arrangement according to the invention is that the sensor element cuts the slurry flow 13 in a narrow area and penetrates the slurry flow in the vertical direction. Now the sensor element 1 reacts better to the changes in the material flow and is not so sensitive to local changes in the velocity. Owing to the relatively small area of the sensor element, the force directed to the sensor element by the flowing of materials with a lower density is minimal, so that the position of the sensor element better represents the flowing of the heavier material with possibly more viscosity, i.e. the flowing of the concentrate.

The sensor element 1 is attempted to make as light-weight as possible, but so that it has a required moment of mass inertia in order to achieve sufficient sensitivity. In the embodiment according to FIGS. 2 and 3, the sensor element 1 is provided with a calibration means 4, such as a movable weight. The calibration means is locked in the sensor element, at a desired point by a locking screw 5. By means of said calibration means, the arrangement according to the invention is calibrated to be suitable for each concentrate and/or application. The calibration takes place by setting the weight 4 at a desired point in the sensor element 1. By means of said calibration means, the mass inertia moment of the sensor element can thus be adjusted.

Typically the sensor element 1 is made of metal, for instance stainless or acid-proof steel, or of plastic. The sensor element can be a bar or a pipe. In cross-section, the sensor element 1 can have any shape that is suitable. The cross-sectional shape and measures of the sensor element vary according to the requirements set by the chosen material and by the target of measurement.

For a man skilled in the art, it is obvious that the invention is not restricted to the above described embodiments, but it can be modified within the scope of the appended claims.

What is claimed is:

1. A flotation cell including a structure defining an outlet opening for discharging concentrate from the flotation cell, the outlet opening having a horizontal dimension and a vertical dimension, and the flotation cell also including a flow measuring arrangement for measuring concentrate flow through the outlet opening, the flow measuring arrangement comprising:

an elongate sensor element mounted relative to said structure in a manner that allows movement of the sensor element relative to said structure under the influence of flow of concentrate through the outlet opening, the sensor element having a length dimension sufficient that the sensor element extends over substantially the entire vertical dimension or the outlet opening and having a width dimension that is parallel to the horizontal dimension of the outlet opening and is substantially less than the horizontal dimension of the outlet opening, and a measuring device for detecting the position of the sensor element.

2. A flotation cell according to claim 1, wherein the measuring device is an angle transmitter for detecting the angular position of the sensor element.

3. A flotation cell according to claim 1, wherein the sensor element is mounted to said structure in a manner allowing angular movement of the sensor element relative to said structure and the measuring device is an angle transmitter.

4. A flotation cell according to claim 1, wherein the flow measuring arrangement includes a horizontal shaft that is pivotally mounted to said structure and the sensor element is attached to the horizontal shaft.

5. A flotation cell according to claim 1, wherein the flow measuring arrangement includes a horizontal shaft that is mounted to said structure and the sensor element is attached to the horizontal shaft.

6. A flotation cell according to claim 1, wherein the flow measuring arrangement includes a horizontal shaft that is pivotally mounted to said structure above the outlet opening, the sensor element is attached to the horizontal shaft and extends downwards therefrom, and the measuring device is an angle transmitter.

7. A flotation cell according to claim 1, wherein the flow measuring arrangement includes a horizontal shaft that is mounted to said structure and extends transversely of the flow direction of concentrate through the outlet opening.

8. A flotation cell according to claim 1, including a control system and wherein the flow measuring arrangement is connected to the control system.

9. A flotation cell according to claim 1, wherein the flow measuring arrangement includes a display unit.

10. A flotation cell according to claim 1, wherein said structure is a drain chute.

11. A flotation cell according to claim 10, wherein the flotation cell also includes a collecting pipe into which the concentrate from the drain chute is discharged, and the sensor element is disposed at least partly in the collecting pipe.

12. A flotation cell according to claim 1, wherein the flow measuring arrangement includes a calibration means.

13. A flotation cell according to claim 12, wherein the calibration means includes a movable weight element attached to the sensor element.

14. A flotation cell including a structure defining an outlet opening for discharging concentrate from the flotation cell, the outlet opening having first and second mutually perpendicular dimensions transverse to the direction of flow of concentrate through the outlet opening, and the flotation cell also including a flow measuring arrangement for measuring concentrate flow through the outlet opening, the flow measuring arrangement comprising:

an elongate sensor element mounted relative to said structure in a manner that allows movement of the sensor element relative to said structure under the influence of flow of concentrate through the outlet opening, the sensor element having a length dimension sufficient that the sensor element extends over substantially the entire first transverse dimension of the outlet opening and having a width dimension that is parallel to the second transverse dimension of the outlet opening and is substantially less than the length dimension of the sensor element, and a measuring device for detecting the position of the sensor element, and wherein the flow measuring arrangement includes a horizontal shaft that is pivotally mounted to said structure above the outlet opening, the sensor element is a rod that is attached to the horizontal shaft and extends downwards there from, and the measuring device is an angle transmitter for measuring deflection of the sensor element.

15. A flotation cell according to claim 14, including a control system and wherein the flow measuring arrangement is connected to the control system.

16. A flotation cell according to claim 14, wherein the flow measuring arrangement includes a display unit.

17. A flotation cell according to claim 14, wherein said structure is a drain chute.

18. A flotation cell according to claim 17, wherein the flotation cell also includes a collecting pipe into which the concentrate from the drain chute is discharged, and the sensor element is disposed at least partly in the collecting pipe.

19. A flotation cell according to claim 14, wherein the flow measuring arrangement includes a calibration means.

20. A flotation cell according to claim 19, wherein the calibration means includes a movable weight element attached to the sensor element.

21. A flotation cell including a structure defining an outlet opening for discharging concentrate from the flotation cell, the outlet opening having a vertical dimension and a horizontal dimension, and the flotation cell also including a flow measuring arrangement for measuring concentrate flow through the outlet opening, the flow measuring arrangement comprising:

an elongate sensor element mounted relative to said structure in a manner that allows movement of the sensor element relative to said structure under the influence of flow of concentrate through the outlet opening, the sensor element being a rod having a length dimension sufficient that the sensor element extends over substantially the entire vertical dimension of the outlet opening and having a width dimension that is parallel to the horizontal dimension of the outlet opening and is substantially less than the horizontal dimension of the outlet opening, and a measuring device for detecting the position of the sensor element.

22. A flotation cell according to claim 21, wherein the measuring device is an angle transmitter for detecting the angular position of the sensor element.

23. A flotation cell according to claim 21, wherein the sensor element is mounted to said structure in a manner allowing angular movement of the sensor element relative to said structure and the measuring device is an angle transmitter.

24. A flotation cell according to claim 21, wherein the flow measuring arrangement includes a horizontal shaft that is pivotally mounted to said structure and the sensor element is attached to the horizontal shaft.

25. A flotation cell according to claim 21, wherein the flow measuring arrangement includes a horizontal shaft that is mounted to said structure and the sensor element is attached to the horizontal shaft.

26. A flotation cell according to claim 21, wherein the flow measuring arrangement includes a horizontal shaft that is pivotally mounted to said structure above the outlet opening, the sensor element is attached to the horizontal shaft and extends downwards therefrom, and the measuring device is an angle transmitter.

27. A flotation cell according to claim 21, wherein the flow measuring arrangement includes a horizontal shaft that is mounted to said structure and extends transversely of the flow direction of concentrate through the outlet opening.

28. A flotation cell according to claim 21, including a control system and wherein the flow measuring arrangement is connected to the control system.

29. A flotation cell according to claim 21, wherein the flow measuring arrangement includes a display unit.

30. A flotation cell according to claim 21, wherein said structure is a drain chute.

31. A flotation cell according to claim 30, wherein the flotation cell also includes a collecting pipe into which the concentrate from the drain chute is discharged, and the sensor element is disposed at least partly in the collecting pipe.

32. A flotation cell according to claim 21, wherein the flow measuring arrangement includes a calibration means.

33. A flotation cell according to claim 32, wherein the calibration means includes a movable weight element attached to the sensor element.

* * * * *